(12) United States Patent
Xie et al.

(10) Patent No.: US 11,743,355 B2
(45) Date of Patent: Aug. 29, 2023

(54) PROMPTING METHOD AND DEVICE

(71) Applicant: Beijing Xiaomi Mobile Software Co., Ltd., Beijing (CN)

(72) Inventors: Yan Xie, Beijing (CN); Ke Wu, Beijing (CN); Huayijun Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 323 days.

(21) Appl. No.: 15/716,532

(22) Filed: Sep. 27, 2017

(65) Prior Publication Data
US 2018/0091614 A1 Mar. 29, 2018

(30) Foreign Application Priority Data
Sep. 28, 2016 (CN) .......................... 201610862966.5

(51) Int. Cl.
*H04W 28/08* (2023.01)
*H04L 67/55* (2022.01)
(Continued)

(52) U.S. Cl.
CPC .............. *H04L 67/55* (2022.05); *H04L 43/10* (2013.01); *H04L 47/125* (2013.01); *H04L 67/125* (2013.01); *H04M 1/72412* (2021.01); *H04M 1/72454* (2021.01); *H04M 19/04* (2013.01); *H04M 19/044* (2013.01);
(Continued)

(58) Field of Classification Search
CPC ....... H04L 67/26; H04L 67/125; H04L 43/10; H04L 12/2678; H04L 47/22; H04L 47/125; H04L 29/06884; H04M 1/7253; H04M 1/72569; H04M 19/04; H04M 19/044; H04W 88/04; H04W 28/00; H04W 28/02; H04W 28/08
See application file for complete search history.

(56) References Cited

U.S. PATENT DOCUMENTS 7,912,075 B1* 3/2011 Holland ................. H04L 65/80
370/216
2002/0097984 A1* 7/2002 Abecassis .......... H04N 21/4722
386/344
(Continued)

FOREIGN PATENT DOCUMENTS

CN 103327384 A 9/2013
CN 104243662 A 12/2014
(Continued)

OTHER PUBLICATIONS

English translation for CN # 104348966 A (Year: 2023).*
(Continued)

*Primary Examiner* — Salvador E Rivas
(74) *Attorney, Agent, or Firm* — Jun He Law Offices P.C.; James J. Zhu

(57) ABSTRACT

A prompting method and device are provided. The method includes that: if a working state of first equipment changes, a state parameter of second equipment is acquired; a prompting manner in which the first equipment prompts that its working state changes is determined according to the state parameter of the second equipment; and the first equipment is controlled to perform prompting according to the prompting manner.

14 Claims, 7 Drawing Sheets

(51) Int. Cl.
  *H04M 19/04* (2006.01)
  *H04M 1/72412* (2021.01)
  *H04M 1/72454* (2021.01)
  *H04L 47/125* (2022.01)
  *H04L 43/10* (2022.01)
  *H04L 67/125* (2022.01)
  *H04W 88/04* (2009.01)
  *H04L 47/22* (2022.01)
  *H04W 28/00* (2009.01)

(52) U.S. Cl.
  CPC ............ *H04W 28/08* (2013.01); *H04W 88/04* (2013.01); *H04L 47/22* (2013.01); *H04W 28/00* (2013.01)

(56) References Cited

U.S. PATENT DOCUMENTS

| | | | | |
|---|---|---|---|---|
| 2006/0014569 A1* | 1/2006 | DelGiorno | ............... | H04M 9/04 455/567 |
| 2008/0122584 A1* | 5/2008 | Itasaki | ............... | G06K 19/0723 340/10.51 |
| 2008/0172542 A1* | 7/2008 | Kaushik | ............... | G06F 3/0665 711/202 |
| 2008/0288217 A1* | 11/2008 | Akao | ............... | G01D 9/005 702/187 |
| 2009/0124296 A1* | 5/2009 | Tanae | ............... | H04M 19/04 455/567 |
| 2009/0312000 A1* | 12/2009 | Wakefield | ............... | H04M 1/7253 455/418 |
| 2010/0054497 A1* | 3/2010 | Bull | ............... | H03G 3/02 381/104 |
| 2013/0072157 A1* | 3/2013 | Brewer | ............... | H04W 12/069 455/411 |
| 2013/0072158 A1* | 3/2013 | Brewer | ............... | H04W 12/0471 455/411 |
| 2013/0072251 A1 | 3/2013 | Kim et al. | | |
| 2013/0198466 A1* | 8/2013 | Kono | ............... | G06F 3/0631 711/161 |
| 2013/0230186 A1* | 9/2013 | Li | ............... | H04R 3/00 381/92 |
| 2015/0105106 A1* | 4/2015 | Masterman | ............ | H04W 4/023 455/456.3 |
| 2016/0100379 A1 | 4/2016 | Nguyen et al. | | |
| 2016/0110155 A1 | 4/2016 | Ievgen et al. | | |
| 2016/0135167 A1* | 5/2016 | Dong | ............... | H04M 1/72569 370/329 |
| 2017/0039025 A1* | 2/2017 | Kielak | ............... | H04R 29/001 |
| 2017/0331952 A1* | 11/2017 | Rogers | ............... | H04L 65/1069 |
| 2018/0091614 A1* | 3/2018 | Xie | ............... | H04M 19/044 |
| 2020/0265745 A1* | 8/2020 | Buras | ............... | G06F 3/011 |

FOREIGN PATENT DOCUMENTS

| | | | |
|---|---|---|---|
| CN | 104348966 A | * | 2/2015 |
| CN | 105120096 A | | 12/2015 |
| CN | 105511307 A | | 4/2016 |
| CN | 106101444 A | | 11/2016 |
| EP | 3007415 A1 | | 4/2016 |
| EP | 3128727 A1 | | 2/2017 |
| JP | 2014140092 A | | 7/2014 |
| JP | 2016032221 A | | 3/2016 |

OTHER PUBLICATIONS

Supplementary European Search Report in European application No. 17190536.7, dated Feb. 13, 2018.
International Search Report in international application No. PCT/CN2016/111322, dated Jun. 22, 2017.
Written Opinion of the International Search Authority in international application No. PCT/CN2016/111322, dated Jun. 22, 2017.
First Office Action of Chinese application No. 201610862966.5 and corresponding English translation, dated Dec. 24, 2018.
First Office Action of Japanese application No. 2017-555717 and corresponding English translation, dated Jan. 22, 2019.

* cited by examiner

PROMPTING METHOD AND DEVICE

CROSS-REFERENCE TO RELATED APPLICATIONS

This application is filed based upon and claims priority to Chinese Patent Application No. 201610862966.5, filed on Sep. 28, 2016, the entire contents of which are incorporated herein by reference.

TECHNICAL FIELD

The present disclosure generally relates to the field of communication, and more particularly to a prompting method and device.

BACKGROUND

Along with development of sciences and technologies, there are more and more types of intelligent equipment, such as a television, a mobile phone and a tablet computer. In daily life, a user may be required to use several types of equipment at the same time, and for example, a mobile phone receives a prompt for an incoming call at the same time when a television is watched.

Typically, when equipment A is working and a working state of equipment B changes, for example, from a non-working state into the working state, a volume of the equipment A is adjusted to prompt a user that the working state of equipment B has changed. For example, if the user is watching a TV and a mobile phone receives an incoming call, the television is automatically muted to prompt the user.

SUMMARY

According to a first aspect of the embodiment of the present disclosure, there is provided a prompting method, which may include that: if a working state of first equipment changes, a state parameter of second equipment is acquired; a prompting manner in which the first equipment prompts that its working state changes is determined according to the state parameter of the second equipment; and the first equipment is controlled to perform prompting according to the prompting manner.

According to a second aspect of the embodiment of the present disclosure, there is provided a prompting device, which may include: a processor; and a memory configured to store instructions executable by the processor, wherein the processor may be configured to: if a working state of first equipment changes, acquire a state parameter of second equipment; determine, according to the state parameter of the second equipment, a prompting manner in which the first equipment prompts that its working state changes; and control the first equipment to perform prompting according to the prompting manner.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
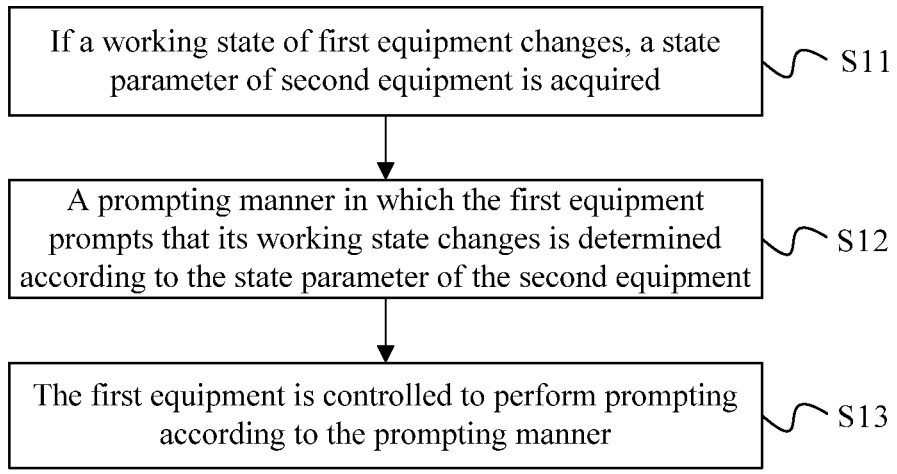
FIG. 1 is a flow chart showing a prompting method, according to an exemplary embodiment.

FIG. 1 is a flow chart showing a prompting method, according to an exemplary embodiment. As shown in FIG. 1, the prompting method involved in the embodiment is applied to terminal equipment, and the prompting method includes the following steps:

Step S11: if a working state of first equipment changes, a state parameter of second equipment is acquired;

Step S12: a prompting manner in which the first equipment prompts that its working state changes is determined according to the state parameter of the second equipment; and Step S13: the first equipment is controlled to perform prompting according to the prompting manner.

Herein, the first equipment and the second equipment may be mobile terminals, Personal Digital Assistant (PDA), computers, televisions and the like, may also be intelligent kitchen equipment, for example, range hoods, gas stoves and electric rice cookers, and may also be doorbells, washing machines and the like. In addition, the condition that the working state of the first equipment changes includes that the first equipment changes from a non-working state into the working state, or changes from the working state into the non-working state, and the like. For example, a mobile terminal changes from a standby state into a called state, a washing machine changes from a working state into a non-working state (washing completion), and a doorbell changes from a waiting state into a working state.

Typically, if the working state of the first equipment changes and the second equipment is in a working state at this moment, volume information of the second equipment is adjusted to achieve a purpose of prompting a user that the state of the first equipment changes. However, the volume information of the second equipment is adjusted, which may affect normal use of the user over the second equipment. Thus, in the embodiment of the present disclosure, after the first equipment detects that its working state changes, the state parameter of the second equipment is acquired, the prompting manner in which the first equipment prompts that its working state changes is determined according to the acquired state parameter of the second equipment, and the first equipment is controlled to perform prompting according to the determined prompting manner. That is, at the same time when prompting is performed by one equipment, the user may be able to use the other equipment, and the normal use of the second equipment will not be affected by adjustment of prompting manner of the second equipment, and user experiences are effectively improved.

It is noted that numbers of the first equipment and the second equipment may be one, and may also be multiple. For example, the first equipment may include a mobile phone and a doorbell, and the second equipment may include a television. When working states of both the mobile phone and the doorbell change, both the mobile phone and the doorbell may acquire a state parameter of the television, determine prompting manners configured to prompt that their own working states change according to the acquired state parameter of the television respectively, and control themselves to perform prompting according to the determined prompting manners. In addition, the numbers of the first equipment and the second equipment may be set according to a practical condition, and there are no limits made to the specific numbers of the first equipment and the second equipment in the embodiment.

According to the prompting method of the embodiment, when it is determined that the working state of the first equipment changes, the prompting manner in which the first equipment prompts that its working state changes is determined according to the state parameter of the second equipment, so that the normal use of the second equipment will not be affected by adjustment of prompting manner of the second equipment. Thus, at the same time when prompting is performed by one equipment, the user may be able to use the other equipment may be met, and user experiences are improved.

In the embodiment of FIG. 1, the state parameter includes at least one of: an output volume of the second equipment; a first parameter configured to represent whether the second equipment is in a working state; and a second parameter configured to represent in which working state the second equipment is.

Specifically, the first parameter may be configured to represent whether the second equipment is in the working state. For example, if the second equipment is an iron, the first parameter may be temperature of the iron, and if the temperature of the iron is higher than 30° C., it is represented that the second equipment is in the working state and the like. The second parameter may be configured to represent in which working state the second equipment is. For example, the second parameter may represent in which working state a washing machine is, such as a soaking, rinsing or dehydration state.

In the abovementioned embodiment, it may be set that the first equipment selects different prompting manners according to different output volumes of the second equipment, whether the second equipment is in the working state or different working states of the second equipment.

In the embodiment, different prompting manners may be set for different output volumes of the second equipment, whether the second equipment is in the working state or not or different working states of the second equipment, thus a user is enabled to be effectively prompted in multiple different application scenarios.

Figure 2:
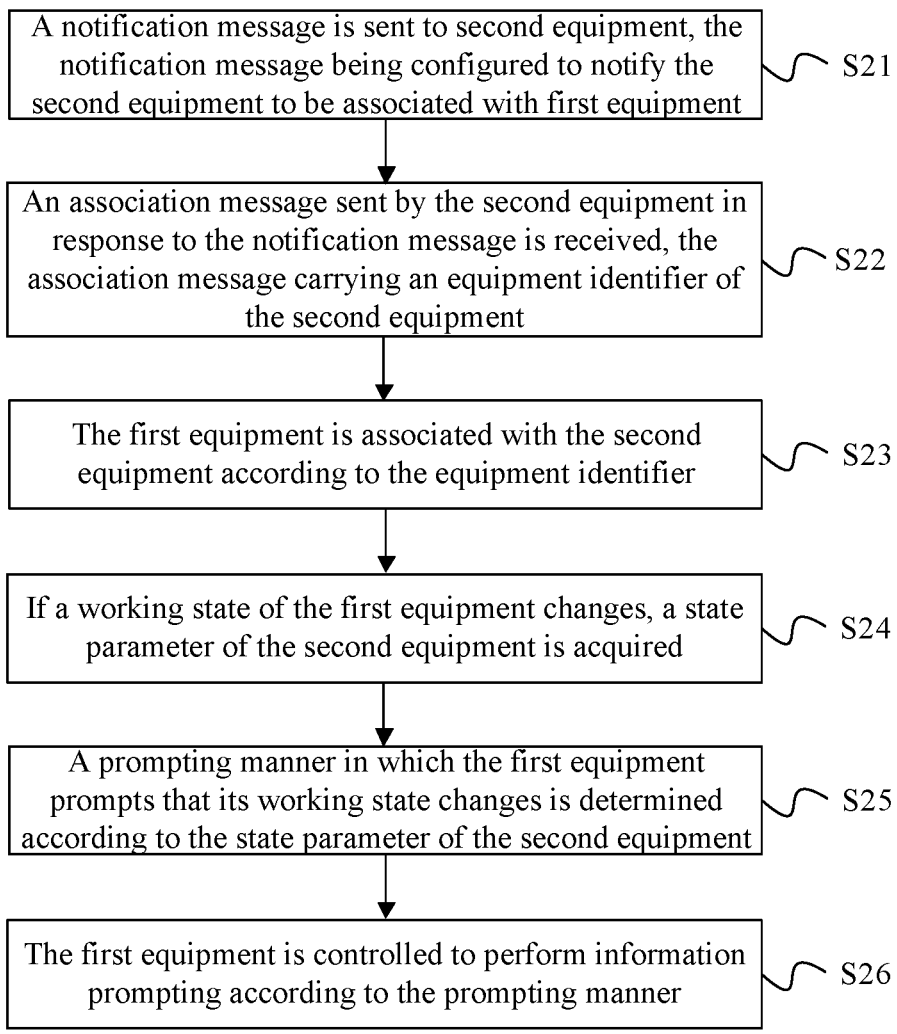
FIG. 2 is a flow chart showing a prompting method, according to another exemplary embodiment.

FIG. 2 is a flow chart showing a prompting method, according to another exemplary embodiment. The method is applied to terminal equipment. On the basis of the abovementioned embodiment, an embodiment of associating first equipment with second equipment before a state parameter of the second equipment is acquired is described in detail. As shown in FIG. 2, the prompting method includes the following steps.

Step S21: a notification message is sent to second equipment, the notification message being configured to notify the second equipment to be associated with first equipment.

In the embodiment, the first equipment sends the notification message to the second equipment to notify the second equipment of executing association with the first equipment, wherein one piece of equipment may send a notification message to one piece of second equipment, one piece of first equipment may also send a notification message to multiple pieces of second equipment at the same time, multiple pieces of first equipment may send notification messages to one piece of second equipment, or multiple pieces of first equipment may send notification messages to multiple pieces of second equipment at the same time. That is, two pieces of equipment may be associated, and multiple pieces of equipment may also be associated.

Step S22: an association message sent by the second equipment in response to the notification message is received, the association message carrying an equipment identifier of the second equipment.

In the embodiment, the second equipment may carry its own equipment identifier in the association message for sending to the first equipment after receiving the notification message sent by the first equipment.

Step S23: the first equipment is associated with the second equipment according to the equipment identifier.

In the embodiment, the first equipment is associated with the second equipment corresponding to the equipment identifier according to the received equipment identifier. In a specific implementation process, an association manner may include a Bluetooth connection, a Wireless-Fidelity (WIFI) connection, a WIFI hotspot, a network signal (such as a 4th-Generation (4G) network signal) and the like.

It is noted that the first equipment may judge whether it is located in the same scenario with the second equipment and whether it is necessary to automatically adjust the prompting manner before the first equipment is associated with the second equipment. For example, if the first equipment is a mobile phone A, the second equipment is a mobile phone B and the mobile phone A is associated with the mobile phone B in a Bluetooth connection manner, since a Bluetooth connection may be successfully established only when the mobile phone A and the mobile phone B are within a certain distance range, for example, within 100 meters, when it is judged whether the mobile phone A and the mobile phone B are located in the same scenario, it is only necessary to judge whether a distance between the mobile phone A and the mobile phone B is smaller than a preset threshold value, and if the distance is smaller than the preset threshold value, it is indicated that they are located in the same scenario. If the mobile phone A is associated with the mobile phone B in a WIFI connection manner, whether they are located in the same scenario may be judged by judging whether the mobile phone A and the mobile phone B are connected with the same WIFI account, and if they are connected with the same WIFI account, the mobile phone A and the mobile phone B are located in the same scenario. If the mobile phone A is associated with the mobile phone B through a network signal (such as a 4G network signal), geographical positions of the mobile phone A and the mobile phone B may be acquired by network-based real-time satellite positioning, whether the distance between the mobile phone A and the mobile phone B is smaller than the preset threshold value is judged to judge whether they are located in the same scenario, and if the distance between the two mobile phones is smaller than the preset threshold value, the mobile phone A and the mobile phone B are located in the same scenario.

Step S24: if a working state of the first equipment changes, a state parameter of the second equipment is acquired.

Step S25: a prompting manner in which the first equipment prompts that its working state changes is determined according to the state parameter of the second equipment.

Step S26: the first equipment is controlled to perform prompting according to the prompting manner.

According to the prompting method of the embodiment, when it is determined that the working state of the first equipment changes, the prompting manner in which the first equipment prompts that its working state changes is determined according to the state parameter of the second equipment, so that the normal use of the second equipment will not be affected by adjustment of prompting manner of the second equipment. Thus, at the same time when prompting is performed by one equipment, the user may be able to use the other equipment. In addition, the first equipment is associated with the second equipment according to the equipment identifier sent by the second equipment, and such an association manner is simpler and easy to operate.

Figure 3:
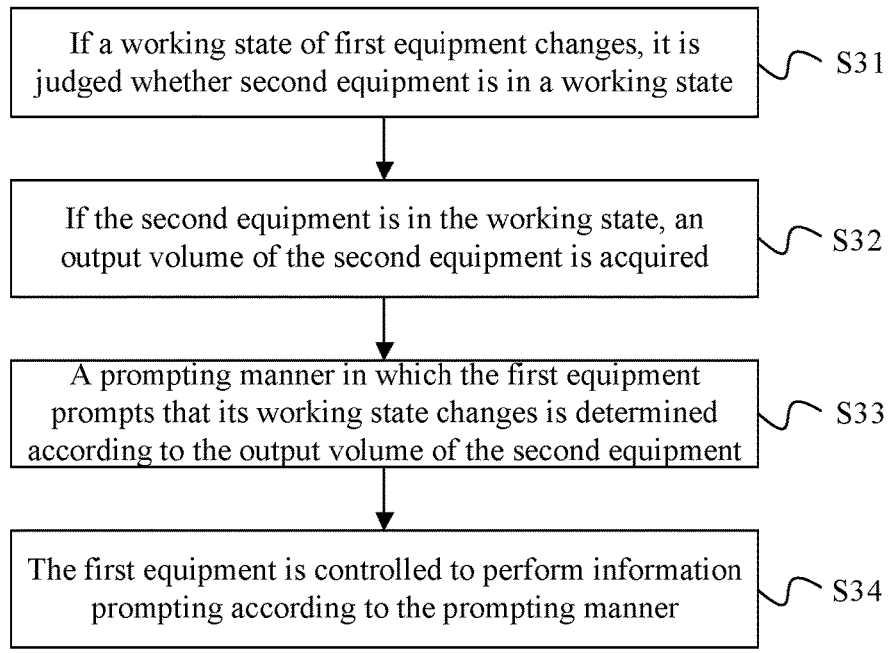
FIG. 3 is a flow chart showing a prompting method, according to another exemplary embodiment.

FIG. 3 is a flow chart showing a prompting method, according to another exemplary embodiment. The method is applied to terminal equipment. On the basis of the embodiment shown in FIG. 1, an embodiment of how to acquire a state parameter of second equipment and how to judge whether the second equipment is in a working state in the case that the state parameter includes an output volume of the second equipment is described in detail. As shown in FIG. 3, the prompting method includes the following steps.

Step S31: if a working state of first equipment changes, it is judged whether second equipment is in a working state.

In the embodiment of the present disclosure, in the case that the state parameter includes an output volume of the second equipment, whether the second equipment is in the working state may be judged in multiple manners as follows.

In some embodiments, it is judged whether the second equipment outputs play data, and if the second equipment outputs the play data, it is determined that the second equipment is in the working state.

Specifically, if the second equipment is multimedia equipment capable of playing a sound or a video, for example, a television, a computer, a mobile phone or a projector, whether the second equipment outputs the play data may be judged to judge whether it is in the working state. In a specific implementation process, whether the second equipment is playing an audio and video file may be judged by judging a file name, file format, file playing time length, played sound and the like involved in playing executed by the second equipment. For example, if a played file name keyword is retrieved to find that the name keyword is matched with a name keyword of an existing movie, television or song, it is judged that the second equipment outputs the play data, thereby judging that the second equipment is in the working state. If a file playing format is retrieved to find that the playing format is an audio and video format such as Moving Picture Experts Group Audio Layer-3 (MP3), Moving Picture Experts Group Audio Layer-4 (MP4) and Audio Video Interleaved (AVI), it is judged that the second equipment outputs the play data, thereby judging that the second equipment is in the working state. If the file playing time length is retrieved to find that the playing time length is larger than a preset time period, it is judged that the second equipment may be playing a movie, that is, the second equipment outputs the play data, thereby judging that the second equipment is in the working state. If a current volume value of the played sound of the second equipment is acquired to find that the current volume value is higher than a mute volume value, it is judged that the second equipment outputs the play data, thereby judging that the second equipment is in the working state.

In addition, whether the second equipment outputs the play data may be judged by adopting any one of the abovementioned manners, and whether the second equipment outputs the play data may also be judged by combining multiple manners. There are no limits made to a specific judgment manner in the embodiment.

In some embodiments, real-time data of the second equipment is acquired, and it is judged according to the real-time data whether the second equipment is in the working state.

Specifically, if the second equipment is an intelligent kitchenware, for example, a range hood, a gas stove, an electric rice cooker or a pressure cooker, the real-time data of the second equipment may be detected to judge whether it is in the working state through a sensor. For example, whether a range hood is started or a started mode (such as a high-strength mode) is detected for judgment.

If the second equipment is an intelligent home terminal, for example, a baby crib, a robot cleaner, an iron, a treadmill or a washing machine, real-time data of the intelligent home terminal may be acquired to judge whether it is in a working state. For example, whether the second equipment is in the working state is judged by detecting a soaking, rinsing and dehydration state of the washing machine, a running rhythm of the treadmill during execution of a running task and the like.

Step S32: if the second equipment is in the working state, an output volume of the second equipment is acquired.

Step S33: a prompting manner in which the first equipment prompts that its working state changes is determined according to the output volume of the second equipment.

In the embodiment of the present disclosure, if it is judged that the second equipment is in the working state, the output volume of the second equipment is acquired. The prompting manner configured to prompt that the working state of the first equipment changes is determined according to the acquired output volume of the second equipment. For example, if the first equipment is a mobile phone, the second equipment is a television and the mobile phone changes from a standby state into a called state when a user is watching the television, the mobile phone acquires an output volume of the television at this moment, and determines own prompting manner according to the output volume of the television.

Step S34: the first equipment is controlled to perform prompting according to the prompting manner.

According to the prompting method of the embodiment, when it is determined that the working state of the first equipment changes, the prompting manner in which the first equipment prompts that its working state changes is determined according to the output volume of the second equipment, so that the normal use of the second equipment will not be affected by adjustment of prompting manner of the second equipment. Thus, at the same time when prompting is performed by one equipment, the user may be able to use the other equipment, and user experiences are improved. In addition, whether the second equipment is in the working state may be judged in multiple different manners, so that the judgment manners are more flexible.

Figure 4:
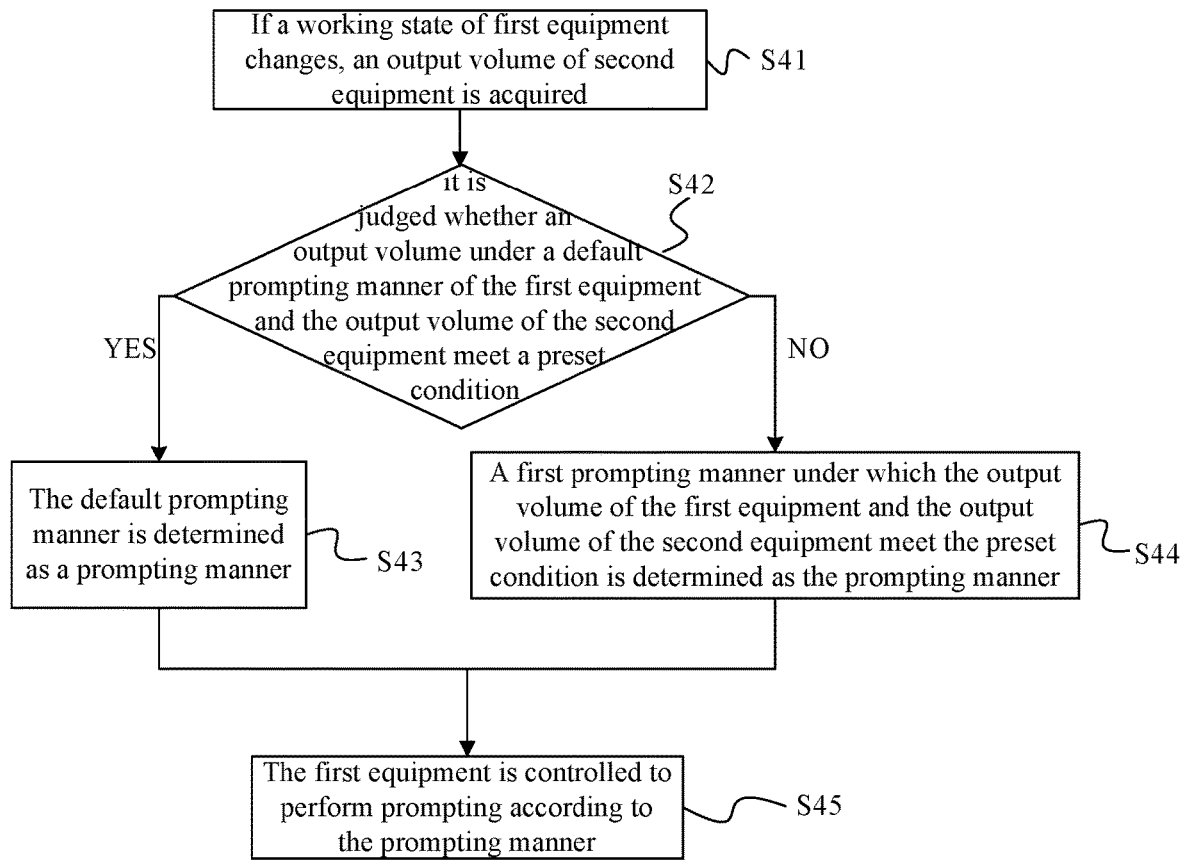
FIG. 4 is a flow chart showing a prompting method, according to another exemplary embodiment.

FIG. 4 is a flow chart showing a prompting method, according to another exemplary embodiment. The method is applied to terminal equipment. On the basis of the embodiment shown in FIG. 1, an embodiment of how to determine a prompting manner in which the first equipment prompts that its own working state changes in the case that a state parameter includes an output volume of second equipment is described in detail. As shown in FIG. 4, the prompting method includes the following steps.

Step S41: if a working state of first equipment changes, an output volume of second equipment is acquired.

Step S42: it is judged whether an output volume under a default prompting manner of the first equipment and the output volume of the second equipment meet a preset condition.

In the embodiment of the present disclosure, the preset condition may be whether the output volume under the default prompting manner of the first equipment is higher than the output volume of the second equipment. After the first equipment acquires the output volume of the second equipment, it is judged whether the output volume under the default prompting manner of the first equipment and the output volume of the second equipment meet the preset condition, Step S43 is executed if YES, otherwise Step S44 is executed.

Step S43: if the output volume under the default prompting manner and the output volume of the second equipment meet the preset condition, the default prompting manner is determined as a prompting manner.

In the embodiment of the present disclosure, if the first equipment judges that the output volume under the default prompting manner and the output volume of the second equipment meet the preset condition, the default prompting manner is determined as the prompting manner. For example, if the first equipment is a mobile phone, the second equipment is a television and an output volume under a default prompting manner of the mobile phone is higher than an output volume of the television when a user is watching the television, that is, the output volume under the default prompting manner and the output volume of the second equipment meet the preset condition, the default prompting manner is determined as a prompting manner of the mobile phone.

Step S44: if the output volume under the default prompting manner and the output volume of the second equipment do not meet the preset condition, a first prompting manner under which the output volume of the first equipment and the output volume of the second equipment meet the preset condition is determined as the prompting manner.

In the embodiment of the present disclosure, if the first equipment judges that the output volume under the default prompting manner and the output volume of the second equipment do not meet the preset condition, the first prompting manner under which the output volume of the first equipment and the output volume of the second equipment meet the preset condition is determined as the prompting manner. In a specific implementation process, if the output volume under the default prompting manner is lower than the output volume of the second equipment, the first prompting manner under which the output volume of the first equipment is lower than the output volume of the second equipment is determined as the prompting manner. For example, if the first equipment is a mobile phone A and the second equipment is a mobile phone B, when the user is playing music with the mobile phone B, its output volume is 10 bars (if a volume magnitude of the mobile phone is set from a mute volume of 0 bar to a full volume of 20 bars, wherein 1 bar represents a volume of a unit), a magnitude relationship between an output volume under a default prompting manner of the mobile phone A and an output volume of the mobile phone B may be judged when the mobile phone A changes from a standby state into a called state, and when the output volume under the default prompting manner of the mobile phone A is 5 bars, a first prompting manner under which an output volume is higher than or equal to 10 bars may be determined as a prompting manner configured to prompt that own state of the mobile phone A changes. For example, the prompting manner of the mobile phone A is set to be 13 bars. For another example: a doorbell changes from a waiting state into a working state when a program is played by a television, and at this moment, if an output volume under a default prompting manner of the doorbell is lower than an output volume of the television, a volume of a prompt tone of the doorbell is automatically increased, etc.

In addition, in another application scenario, if the output volume under the default prompting manner is higher than the output volume of the second equipment, the first prompting manner under which the output volume of the first equipment is lower than or equal to the output volume of the second equipment may also be determined as the prompting manner. For example, if the first equipment is a mobile phone and the second equipment is a projector, the mobile phone receives an incoming call when the projector in an office is playing a video, and at this moment, if an output volume under a default prompting manner of the mobile phone is higher than an output volume of the projector, the prompting manner of the mobile phone may be adjusted into a mute, vibration or do not disturb mode and the like, to prevent influence of sound information such as a ringtone produced when the mobile phone suddenly receives an incoming call on video image watching of the user or another user.

Step S45: the first equipment is controlled to perform prompting according to the prompting manner.

According to the prompting method of the embodiment, when it is determined that the working state of the first equipment changes, the prompting manner in which the first equipment prompts that its working state changes is determined according to the state parameter of the second equipment, so that the normal use of the second equipment will not be affected by adjustment of prompting manner of the second equipment. Thus, at the same time when prompting is performed by one equipment, the user may be able to use the other equipment, and user experiences are improved. In addition, in the case that the state parameter includes the output volume of the second equipment, the prompting manner of the first equipment is flexibly determined according to a relationship between the output volume under the default prompting manner of the first equipment and the output volume of the second equipment, and may be set to be different according to a requirement of the user in different application scenarios, so that user experiences are further effectively improved.

Figure 5:
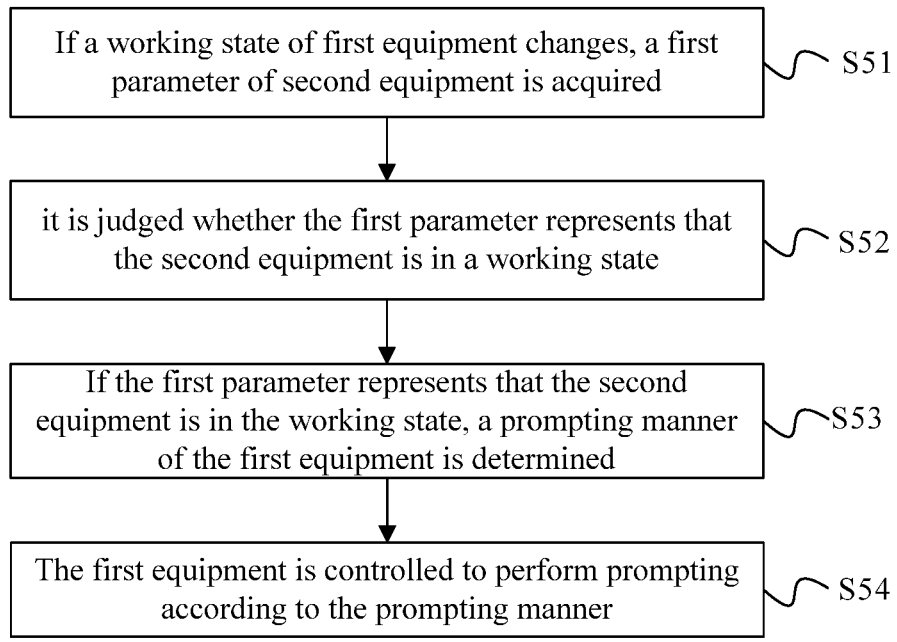
FIG. 5 is a flow chart showing a prompting method, according to another exemplary embodiment.

FIG. 5 is a flow chart showing a prompting method, according to another exemplary embodiment. The method is applied to terminal equipment. On the basis of the embodiment shown in FIG. 1, an embodiment of how to determine a prompting manner in which the first equipment prompts that its working state changes in the case that a state parameter includes a first parameter is described in detail. As shown in FIG. 5, the prompting method includes the following steps.

Step S51: if a working state of first equipment changes, a first parameter of second equipment is acquired.

Herein, the first parameter is configured to represent whether the second equipment is in a working state.

Step S52: it is judged whether the first parameter represents that the second equipment is in a working state.

Step S53: in the case that the first parameter represents that the second equipment is in the working state, a prompting manner of the first equipment is determined.

In the embodiment of the present disclosure, the first parameter may be configured to represent whether the second equipment is in the working state. Whether the first parameter represents that the second equipment is in the working state may be judged after the first equipment acquires the first parameter, and when the second equipment is in the working state, the prompting manner of the first equipment is determined. For example, if the second equipment is a baby crib, a sensor is arranged on the baby crib, whether there is a baby sleeping may be acquired through the sensor, and if YES, it is considered that the baby crib is in a working state. If it is judged that the baby crib is in the working state through the first parameter and a mobile phone changes from a standby state into a called state at this moment, a volume of the mobile phone is decreased or the mobile phone is adjusted into a mute mode, a vibration mode or the like. If the second equipment is a range hood, a first parameter such as whether the range hood is started or a started mode may be acquired to learn about whether the range hood is in a working state at this moment, it is indicated that the range hood is in the working state if the range hood is in a started state, and if it is judged that the range hood is in the working state through the first parameter and the mobile phone changes from the standby state into the called state at this moment, the volume of the mobile phone is increased, etc. In addition, if the second equipment is a treadmill, a first parameter whether the treadmill is started or a running rhythm may be acquired to learn about whether the treadmill is in a working state at this moment, and if the treadmill is in a started state, it is indicated that the treadmill is in the working state. If it is judged that the treadmill is in the working state through the first parameter and the mobile phone changes from the standby state into the called state at this moment, the volume of the mobile phone is increased, and the volume of the mobile phone is continuously adjusted along with the rhythm of the treadmill, for example, the faster the running rhythm, the higher the volume of the mobile phone.

Step S54: the first equipment is controlled to perform prompting according to the prompting manner.

According to the prompting method of the embodiment, when it is determined that the working state of the first equipment changes, the prompting manner in which the first equipment prompts that its working state changes is determined according to the state parameter of the second equipment, so that the normal use of the second equipment will not be affected by adjustment of prompting manner of the second equipment. Thus, at the same time when prompting is performed by one equipment, the user may be able to use the other equipment, and user experiences are improved. In addition, the prompting manner of the first equipment is determined in the case that the second equipment is in the working state, so that a usage requirement from the user with respect to whether the second equipment works or not may further be met, and user experiences are improved.

Figure 6:
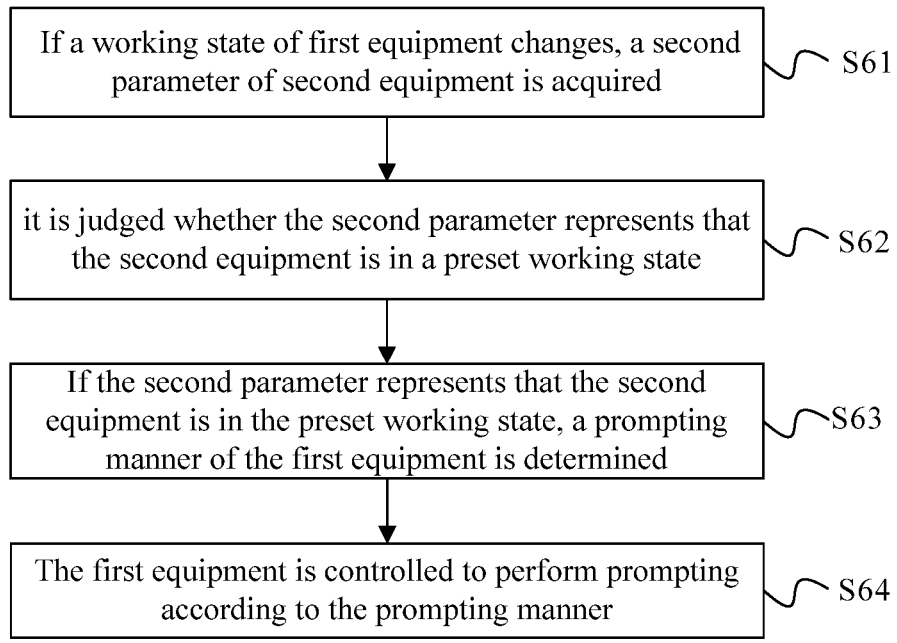
FIG. 6 is a flow chart showing a prompting method, according to another exemplary embodiment.

FIG. 6 is a flow chart showing a prompting method, according to another exemplary embodiment. The method is applied to terminal equipment. On the basis of the embodiment shown in FIG. 1, an embodiment of how to determine a prompting manner in which the first equipment prompts that its working state changes in the case that a state parameter includes a second parameter is described in detail. As shown in FIG. 6, the prompting method includes the following steps.

Step S61: if a working state of first equipment changes, a second parameter of second equipment is acquired.

Wherein the second parameter is configured to represent in which working state the second equipment is.

Step S62: it is judged whether the second parameter represents that the second equipment is in a preset working state.

Step S63: in the case that the second parameter represents that the second equipment is in the preset working state, a prompting manner of the first equipment is determined.

In the embodiment of the present disclosure, the second parameter may be configured to represent in which working state the second equipment is. For example, if the second equipment is a washing machine, since the washing machine includes multiple working states, such as soaking, washing, rinsing and dehydration, the second parameter may represent in which specific working state the washing machine is. After acquiring the second parameter, the first equipment judges whether the second parameter represents that the second equipment is in the preset working state. For example, it is judged whether the washing machine is in the rinsing state. When it is judged that the second equipment is in the preset working state, the prompting manner of the first equipment is determined. For example, if the washing machine is in the soaking state (noiseless) and a mobile phone receives an incoming call, a volume of the mobile phone may be adjusted into 8 bars; if the washing machine is in the washing state (noisy and with relatively low noise) and the mobile phone receives an incoming call, the volume of the mobile phone is adjusted into 10 bars; if the washing machine is in the rinsing state (noisy and with not loud noise) and the mobile phone receives an incoming call, the volume of the mobile phone may be adjusted into 12 bars; and if the washing machine is in the dehydration state (noisy and with relatively louder noise) and the mobile phone receives an incoming call, the volume of the mobile phone may be adjusted into 15 bars, etc.

Step S64: the first equipment is controlled to perform prompting according to the prompting manner.

According to the prompting method of the embodiment, when it is determined that the working state of the first equipment changes, the prompting manner in which the first equipment prompts that its working state changes is determined according to the state parameter of the second equipment, so that the normal use of the second equipment will not be affected by adjustment of prompting manner of the second equipment. Thus, at the same time when prompting is performed by one equipment, the user may be able to use the other equipment, and user experiences are improved. In addition, confirmation of the prompting manner of the first equipment is executed in the case that the second equipment is in the preset working state, so that a usage requirement from the user with respect to a specific working mode of the second equipment may be met, and user experiences are improved.

Figure 7:
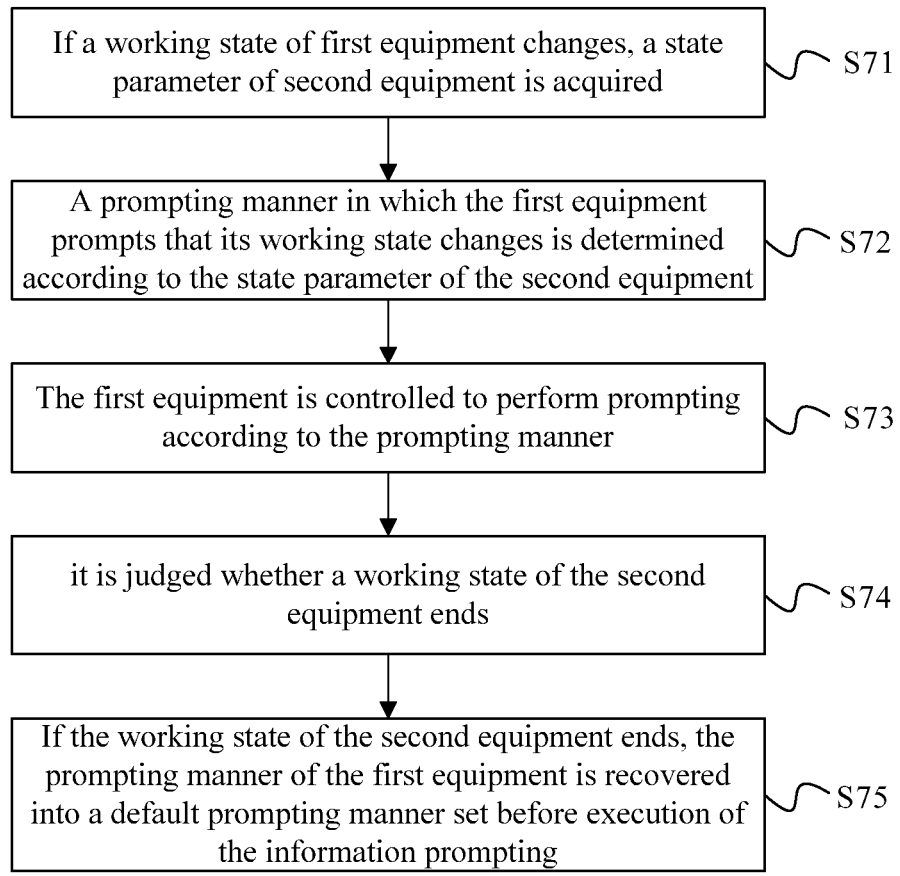
FIG. 7 is a flow chart showing a prompting method, according to another exemplary embodiment.

FIG. 7 is a flow chart showing a prompting method, according to another exemplary embodiment. The method is applied to terminal equipment. On the basis of the embodiment shown in FIG. 1, an embodiment of recovering a prompting manner of first equipment into a default prompting manner set before execution of the prompting if a working state of second equipment ends after the first equipment is controlled to perform prompting according to the prompting manner is described in detail. As shown in FIG. 7, the prompting method includes the following steps.

Step S71: if a working state of first equipment changes, a state parameter of second equipment is acquired.

Step S72: a prompting manner in which the first equipment prompts that its working state changes is determined according to the state parameter of the second equipment.

Step S73: the first equipment is controlled to perform prompting according to the prompting manner.

Step S74: it is judged whether a working state of the second equipment ends.

Step S75: if the working state of the second equipment ends, the prompting manner of the first equipment is recovered into a default prompting manner set before execution of the prompting.

In the embodiment, if it is acquired that the working state of the second equipment ends, for example, playing of a file such as an audio and a video is ended, the prompting manner of the first equipment is automatically recovered into the default prompting manner set before execution of the prompting. For example, if the first equipment is a mobile phone A, the second equipment is a television and a user is watching a program through the television when the mobile phone A receives an incoming call, the mobile phone A may adjust a prompting manner of the mobile phone A from a mute volume to a volume of 10 bars according to a state parameter of the television, and after judging that a working state of the television ends, the mobile phone A may recover its own prompting manner into a mute state.

According to the prompting method of the embodiment, when it is determined that the working state of the first equipment changes, the prompting manner in which the first equipment prompts that its working state changes is determined according to the state parameter of the second equipment, so that the normal use of the second equipment will not be affected by adjustment of prompting manner of the second equipment. Thus, at the same time when prompting is performed by one equipment, the user may be able to use the other equipment, and user experiences are improved. In addition, the prompting manner of the first equipment is recovered into the default prompting manner set before execution of the prompting to be more consistent with a usual using habit of the user after the working state of the second equipment ends.

A prompting device will be provided below according to the embodiment of the present disclosure, which is configured to execute the abovementioned prompting method.

Figure 8:
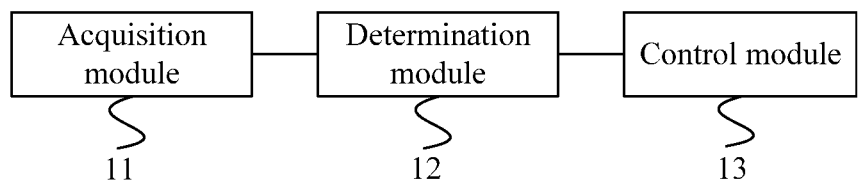
FIG. 8 is a block diagram of a prompting device, according to an exemplary embodiment.

FIG. 8 is a block diagram of a prompting device, according to an exemplary embodiment. As shown in FIG. 8, the prompting device includes an acquisition module 11, a determination module 12 and a control module 13.

The acquisition module 11 is configured to, if a working state of first equipment changes, acquire a state parameter of second equipment.

The determination module 12 is configured to determine, according to the state parameter of the second equipment that is acquired by the acquisition module 11, a prompting manner in which the first equipment prompts that its working state changes.

The control module 13 is configured to control the first equipment to perform prompting according to the prompting manner.

In the embodiment, when it is determined that the working state of the first equipment changes, the determination module 12 determines, according to the state parameter of the second equipment, the prompting manner in which the first equipment prompts that its working state changes, so that the normal use of the second equipment will not be affected by adjustment of prompting manner of the second equipment. Thus, at the same time when prompting is performed by one equipment, the user may be able to use the other equipment, and user experiences are improved.

Herein, the state parameter includes at least one of:

an output volume of the second equipment;

a first parameter configured to represent whether the second equipment is in a working state; and a second parameter configured to represent in which working state the second equipment is.

In the embodiment, different prompting manners may be set for different output volumes of the second equipment, whether the second equipment is in the working state or not or different working states of the second equipment, thus a user is enabled to be effectively prompted in multiple different application scenarios.

Figure 9:
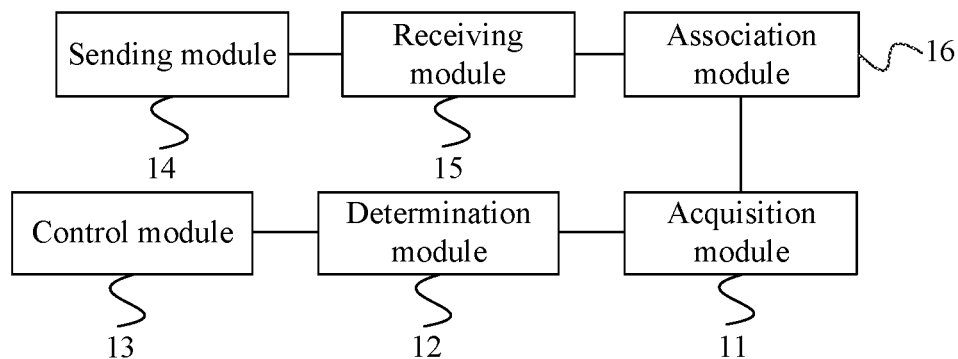
FIG. 9 is a block diagram of a prompting device, according to another exemplary embodiment.

Herein, as shown in FIG. 9, FIG. 9 is a block diagram of a prompting device, according to another exemplary embodiment. On the basis of the embodiment shown in FIG. 8, the device also includes a sending module 14, a receiving module 15 and an association module 16.

The sending module 14 is configured to send a notification message to the second equipment, the notification message being configured to notify the second equipment to be associated with first equipment.

The receiving module 15 is configured to receive an association message sent by the second equipment in response to the notification message, the association message carrying an equipment identifier of the second equipment.

The association module 16 is configured to associate the first equipment with the second equipment according to the equipment identifier received by the receiving module 15.

In the embodiment, the first equipment is associated with the second equipment according to the equipment identifier sent by the second equipment, and such an association manner is simpler and easy to operate.

Figure 10:
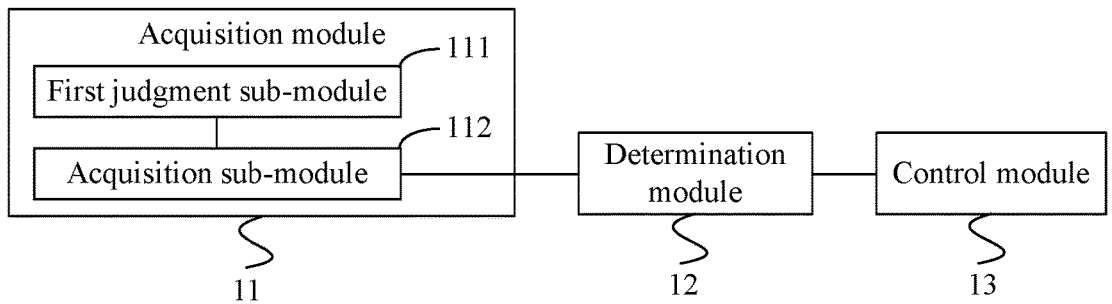
FIG. 10 is a block diagram of a prompting device, according to another exemplary embodiment.

Herein, as shown in FIG. 10, FIG. 10 is a block diagram of a prompting device, according to another exemplary embodiment. On the basis of the embodiment shown in FIG. 8, in the case that the state parameter includes the output volume of the second equipment, the acquisition module 11 includes: a first judgment sub-module 111 and an acquisition sub-module 112.

The first judgment sub-module 111 is configured to judge whether the second equipment is in the working state.

The acquisition sub-module 112 is configured to, when the first judgment sub-module 111 judges that the second equipment is in the working state, acquire the output volume of the second equipment.

In the embodiment, acquisition of the output volume is executed only in the case that the second equipment is in the working state, so that resource waste caused by execution of volume acquisition when the second equipment is in a non-working state is avoided.

Figure 11:
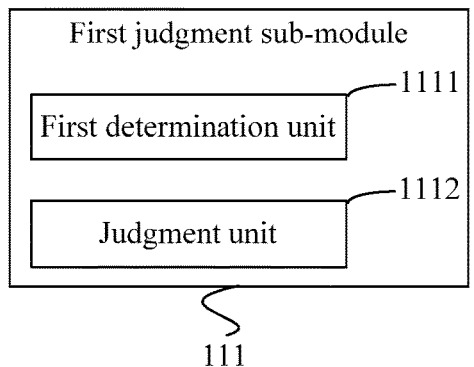
FIG. 11 is a block diagram of a prompting device, according to another exemplary embodiment.

Herein, as shown in FIG. 11, FIG. 11 is a block diagram of a prompting device, according to another exemplary embodiment. On the basis of the embodiment shown in FIG. 10, the first judgment sub-module 111 includes a first determination unit 1111 or a judgment unit 1112.

The first determination unit 1111 is configured to judge whether the second equipment outputs play data, and if the second equipment outputs the play data, determine that the second equipment is in the working state; or, the judgment unit 1112 is configured to acquire real-time data of the second equipment, and judge according to the real-time data whether the second equipment is in the working state.

In the embodiment, whether the second equipment is in the working state may be judged in multiple different manners, so that the judgment manners are more flexible.

Figure 12:
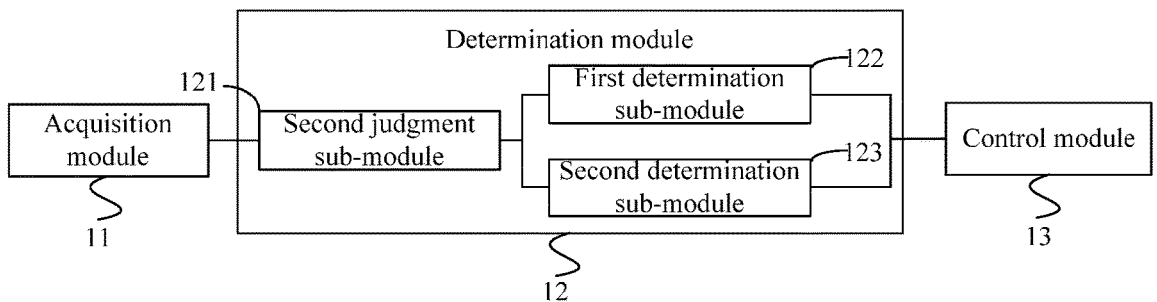
FIG. 12 is a block diagram of a prompting device, according to another exemplary embodiment.

Herein, as shown in FIG. 12, FIG. 12 is a block diagram of a prompting device, according to another exemplary embodiment. On the basis of the embodiment shown in FIG. 8, in the case that the state parameter includes the output volume of the second equipment, the determination module 12 includes: a second judgment sub-module 121, a first determination sub-module 122 and a second determination sub-module 123.

The second judgment sub-module 121 is configured to judge whether an output volume under a default prompting manner of the first equipment and the output volume of the second equipment meet a preset condition.

The first determination sub-module 122 is configured to, when the second judgment sub-module 121 judges that the output volume under the default prompting manner and the output volume of the second equipment meet the preset condition, determine the default prompting manner as the prompting manner.

The second determination sub-module 123 is configured to, when the second judgment sub-module 121 judges that the output volume under the default prompting manner and the output volume of the second equipment do not meet the preset condition, determine a first prompting manner under which the output volume of the first equipment and the output volume of the second equipment meet the preset condition as the prompting manner.

In the embodiment, in the case that the output volume under the default prompting manner of the first equipment and the output volume of the second equipment meet the preset condition, prompting may be directly performed according to the default prompting manner, and the prompting manner is not required to be changed, so that unnecessary resource waste is avoided.

Figure 13:
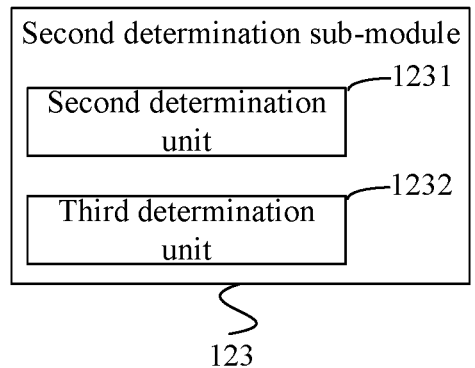
FIG. 13 is a block diagram of a prompting device, according to another exemplary embodiment.

Herein, as shown in FIG. 13, FIG. 13 is a block diagram of a prompting device, according to another exemplary embodiment. On the basis of the embodiment shown in FIG. 12, the second determination sub-module 123 includes: a second determination unit 1231 or a third determination unit 1232.

The second determination unit 1231 is configured to, in the case that the output volume under the default prompting manner is lower than the output volume of the second equipment, determine the first prompting manner under which the output volume of the first equipment is higher than or equal to the output volume of the second equipment as the prompting manner;

or, the third determination unit 1232 is configured to, in the case that the output volume under the default prompting manner is higher than the output volume of the second equipment, determine the first prompting manner under which the output volume of the first equipment is lower than or equal to the output volume of the second equipment as the prompting manner.

In the embodiment, in the case that the state parameter includes the output volume of the second equipment, the prompting manner of the first equipment is flexibly determined according to a relationship between the output volume under the default prompting manner of the first equipment and the output volume of the second equipment, and may be set to be different according to a requirement of the user in different application scenarios, so that user experiences are further effectively improved.

Figure 14:
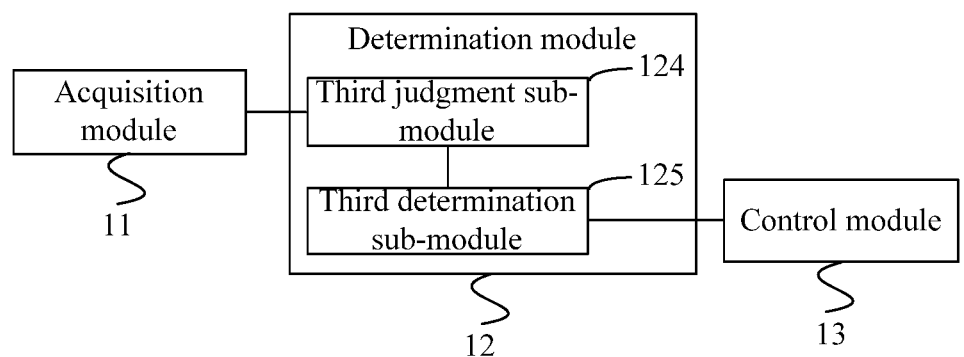
FIG. 14 is a block diagram of a prompting device, according to another exemplary embodiment.

Herein, as shown in FIG. 14, FIG. 14 is a block diagram of a prompting device, according to another exemplary embodiment. On the basis of the embodiment shown in FIG. 8, in the case that the state parameter includes the first parameter, the determination module 12 includes: a third judgment sub-module 124 and a third determination sub-module 125.

The third judgment sub-module 124 is configured to judge whether the first parameter represents that the second equipment is in the working state.

The third determination sub-module 125 is configured to, in the case that the third judgment sub-module 124 judges that the first parameter represents that the second equipment is in the working state, determine the prompting manner.

In the embodiment, the prompting manner of the first equipment is determined in the case that the second equipment is in the working state, so that a usage requirement from the user with respect to whether the second equipment works or not may be met, and user experiences are improved.

Figure 15:
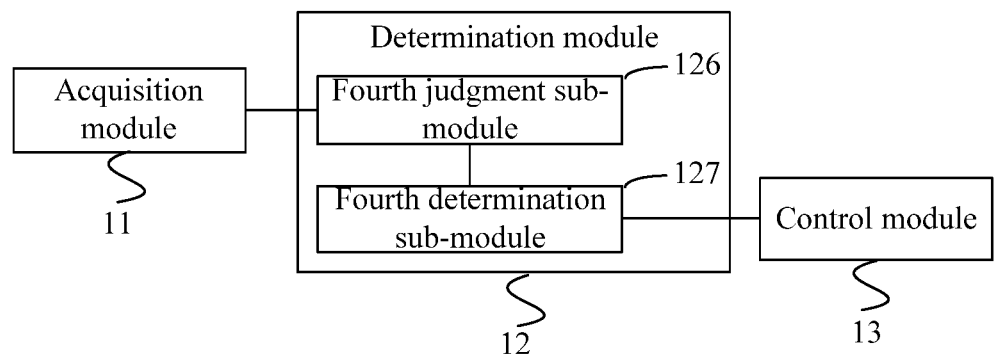
FIG. 15 is a block diagram of a prompting device, according to another exemplary embodiment.

Herein, as shown in FIG. 15, FIG. 15 is a block diagram of a prompting device, according to another exemplary embodiment. On the basis of the embodiment shown in FIG. 8, in the case that the state parameter includes the second parameter, the determination module 12 includes: a fourth judgment sub-module 126 and a fourth determination sub-module 127.

The fourth judgment sub-module 126 is configured to judge whether the second parameter represents that the second equipment is in a preset working state.

The fourth determination sub-module 127 is configured to, in the case that the fourth judgment sub-module 126 judges that the second parameter represents that the second equipment is in the preset working state, determine the prompting manner.

In the embodiment, confirmation of the prompting manner of the first equipment is executed in the case that the second equipment is in the preset working state, so that a usage requirement from the user with respect to a specific working mode of the second equipment may be met, and user experiences are improved.

Figure 16:
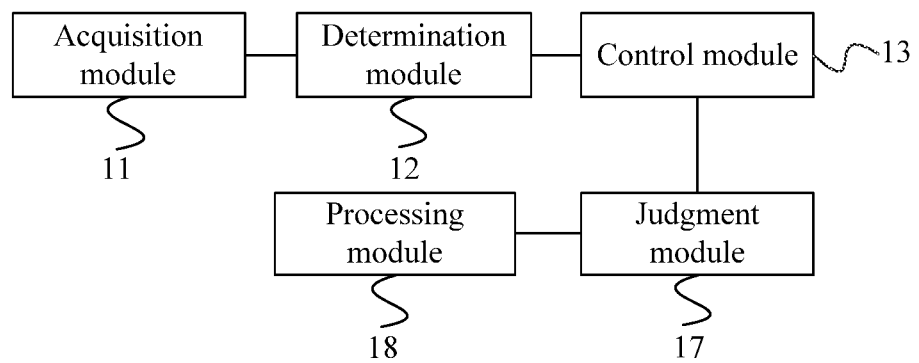
FIG. 16 is a block diagram of a prompting device, according to another exemplary embodiment.

Herein, as shown in FIG. 16, FIG. 16 is a block diagram of a prompting device, according to another exemplary embodiment. On the basis of the embodiment shown in FIG. 8, the device also includes: a judgment module 17 and a processing module 18.

The judgment module 17 is configured to judge whether the working state of the second equipment ends.

The processing module 18 is configured to, when the judgment module 17 judges that the working state of the second equipment ends, recover the prompting manner of the first equipment into a default prompting manner set before execution of the prompting.

In the embodiment, the prompting manner of the first equipment is recovered into the default prompting manner set before execution of the prompting to be more consistent with a usual using habit of the user after the working state of the second equipment ends.

With respect to the devices in the above embodiments, the specific manners for performing operations for individual modules therein have been described in detail in the embodiments regarding the methods, which will not be elaborated herein.

The embodiment of the present disclosure also provides a prompting device, which includes:

a processor; and a memory configured to store instructions executable by the processor, wherein the processor is configured to:

if a working state of first equipment changes, acquire a state parameter of second equipment;

determine, according to the state parameter of the second equipment, a prompting manner in which the first equipment prompts that its working state changes; and control the first equipment to perform prompting according to the prompting manner.

According to the prompting device of the embodiment, when it is determined that the working state of the first equipment changes through the processor, the prompting manner in which the first equipment prompts that its working state changes is determined according to the state parameter of the second equipment, so that the normal use of the second equipment will not be affected by adjustment of prompting manner of the second equipment. Thus, at the same time when prompting is performed by one equipment, the user may be able to use the other equipment, and user experiences are improved.

Figure 17:
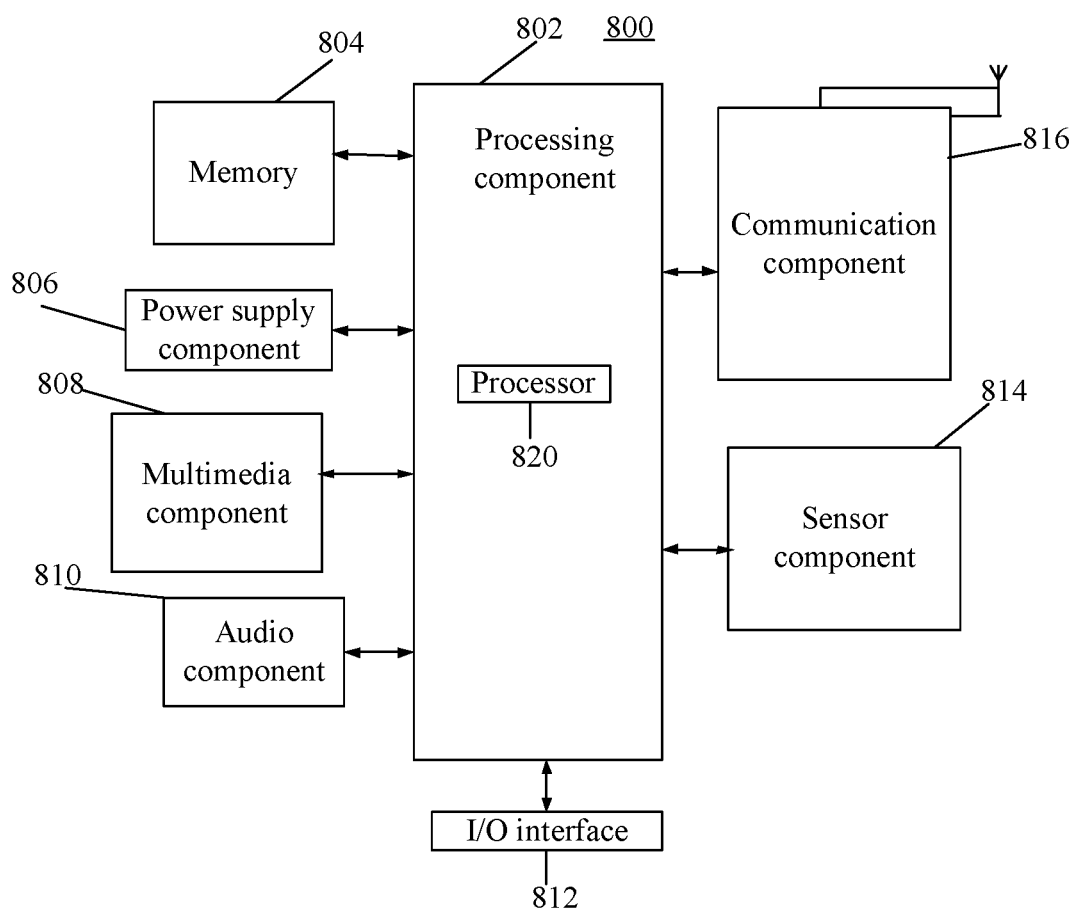
FIG. 17 is a block diagram of a prompting device, according to an exemplary embodiment.

FIG. 17 is a block diagram of a prompting device, according to an exemplary embodiment. For example, the device 800 may be a mobile phone, a computer, a digital broadcast terminal, a messaging device, a gaming console, a tablet, a medical device, exercise equipment and a personal digital assistant.

Referring to FIG. 17, the device 800 may include one or more of the following components: a processing component 802, a memory 804, a power supply component 806, a multimedia component 808, an audio component 810, an Input/Output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the device 800. Examples of such data include instructions for any application programs or methods operated on the device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power supply component 806 provides power for various components of the device 800. The power supply component 806 may include a power management system, one or more power supplies, and other components associated with the generation, management and distribution of power for the device 800.

The multimedia component 808 includes a screen providing an output interface between the device 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode and a voice recognition mode. The received audio signal may be further stored in the memory 804 or sent through the communication component 816. In some embodiments, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and another device. The device 800 may access a communication-standard-based wireless network, such as a WIFI network, a 2nd-Generation (2G) or 3rd-Generation (3G) network or a combination thereof. In an exemplary embodiment, the communication component 816 receives a broadcast signal or broadcast associated information from an external broadcast management system through a broadcast channel. In an exemplary embodiment, the communication component 816 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth (BT) technology and another technology.

In an exemplary embodiment, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 804 including an instruction, and the instruction may be executed by the processor 820 of the device 800 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

According to a non-transitory computer-readable storage medium, when an instruction in the storage medium is executed by a processor of a mobile terminal, the mobile terminal may execute a prompting method. The method includes that:

if a working state of first equipment changes, a state parameter of second equipment is acquired;

a prompting manner in which the first equipment prompts that its working state changes is determined according to the state parameter of the second equipment; and the first equipment is controlled to perform prompting according to the prompting manner.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

INDUSTRIAL APPLICABILITY

According to the embodiments of the present disclosure, when it is determined that the working state of the first equipment changes, the prompting manner in which the first equipment prompts that its working state changes is determined according to the state parameter of the second equipment, so that the normal use of the second equipment will not be affected by adjustment of prompting manner of the second equipment. Thus, at the same time when prompting is performed by one equipment, the user may be able to use the other equipment, and user experiences are improved.

What is claimed is:

1. A prompting method, comprising:
   determining, by first equipment, a type of second equipment according to an equipment identifier of the second equipment;
   if a working state of the first equipment changes, acquiring, by the first equipment, a state parameter of the second equipment having a plurality of available working states each corresponding to a working operation of the second equipment, wherein the state parameter represents a current working operation of the second equipment with a predefined volume;
   in response to the second equipment being of a first type, adjusting a prompting manner of the first equipment into mute or vibration;
   in response to the second equipment being of a second type,
   judging, by the first equipment, whether an output volume under a default prompting manner of the first equipment is higher than or equal to the predefined volume;
   in response to that the output volume under the default prompting manner of the first equipment being lower than the predefined volume, outputting, by the first equipment, the predefined volume so as to prompt that the working state of the first equipment changes; and
   in response to that the output volume under the default prompting manner of the first equipment being greater than or equal to the predefined volume, outputting, by the first equipment, the output volume under the default prompting manner of the first equipment so as to prompt that the working state of the first equipment changes.

2. The method according to claim 1, before determining, by the first equipment, the type of second equipment according to the equipment identifier of the second equipment, the method further comprising:
   sending a notification message to the second equipment, the notification message being configured to notify the second equipment to be associated with the first equipment;
   receiving an association message sent by the second equipment in response to the notification message, the association message carrying the equipment identifier of the second equipment; and associating the first equipment with the second equipment according to the equipment identifier.

3. The method according to claim 1, wherein acquiring the state parameter of the second equipment comprises:
determining a current working state of the second equipment from the plurality of available working states;
acquiring the state parameter of the second equipment according to the current working state of the second equipment.

4. The method according to claim 3, wherein determining the current working state of the second equipment comprises:
acquiring real-time data of the second equipment; and
judging, according to the real-time data, whether the second equipment is in the current working state.

5. The method according to claim 3, wherein each of the plurality of available working states corresponds to a respective predefined volume, and for each of the predefined volumes, a respective adjusted volume corresponding to and greater than the predefined volume is set for the first equipment, the method further comprises:
determining the predefined volume corresponding to the current working state of the second equipment; and
adjusting, according to the predefined volume corresponding to the current working state of the second equipment, the first equipment to output the respective adjusted volume corresponding to the predefined volume.

6. The method according to claim 1, after controlling the first equipment to perform prompting according to the prompting manner, the method further comprising:
judging whether the working state of the second equipment ends; and
if the working state of the second equipment ends, recovering the prompting manner of the first equipment into a default prompting manner set before execution of the prompting.

7. The method according to claim 1, wherein the second equipment of the first type comprises at least one of a projector, a TV, a baby crib, or a mobile phone,
the second equipment of the second type comprises at least one of a TV, a mobile phone, or a washing machine.

8. A prompting device, comprising:
a processor; and
a memory configured to store instructions executable by the processor,
wherein the processor is configured to:
determine a type of second equipment according to an equipment identifier of the second equipment;
if a working state of first equipment changes, acquire a state parameter of the second equipment having a plurality of available working states each corresponding to a working operation of the second equipment, wherein the state parameter represents a current working operation of the second equipment with a predefined volume;
in response to the second equipment being of a first type, adjust a prompting manner of the first equipment into mute or vibration;
in response to the second equipment being of a second type,
judge whether an output volume under a default prompting manner of the first equipment is higher than or equal to the predefined volume;
in response to that the output volume under the default prompting manner of the first equipment being lower than the predefined volume, output the predefined volume so as to prompt that the working state of the first equipment changes; and
in response to that the output volume under the default prompting manner of the first equipment being greater than or equal to the predefined volume, output the output volume under the default prompting manner of the first equipment so as to prompt that the working state of the first equipment changes.

9. The device according to claim 8, before determining the type of second equipment according to the equipment identifier of the second equipment, wherein the processor is further configured to:
send a notification message to the second equipment, the notification message being configured to notify the second equipment to be associated with the first equipment;
receive an association message sent by the second equipment in response to the notification message, the association message carrying the equipment identifier of the second equipment; and
associate the first equipment with the second equipment according to the equipment identifier.

10. The device according to claim 8, wherein the processor configured to acquire the state parameter of the second equipment is further configured to:
determine a current working state of the second equipment from the plurality of available working states;
acquire the state parameter of the second equipment according to the current working state of the second equipment.

11. The device according to claim 10, wherein the processor configured to determine the current working state of the second equipment is further configured to:
judge whether the second equipment outputs play data; and
if the second equipment outputs the play data, determine that the second equipment is in the current working state.

12. The device according to claim 10, wherein the processor configured to determine the current working state of the second equipment is further configured to:
acquire real-time data of the second equipment; and
judge, according to the real-time data, whether the second equipment is in the current working state.

13. The prompting device according to claim 10, wherein each of the plurality of available working states corresponds to a respective predefined volume, and for each of the predefined volumes, a respective adjusted volume corresponding to and greater than the predefined volume is set for the first equipment, the processor is further configured to:
determine the predefined volume corresponding to the current working state of the second equipment; and
adjust, according to the predefined volume corresponding to the current working state of the second equipment, the first equipment to output the respective adjusted volume corresponding to the predefined volume.

14. The prompting device according to claim 8, wherein the second equipment of the first type comprises at least one of a projector, a TV, a baby crib, or a mobile phone,
the second equipment of the second type comprises at least one of a TV, a mobile phone, or a washing machine.

* * * * *